United States Patent
Sumiya et al.

(10) Patent No.: US 7,936,941 B2
(45) Date of Patent: May 3, 2011

(54) APPARATUS FOR CLEARING AN IMAGE AND METHOD THEREOF

(75) Inventors: Kazunori Sumiya, Ishikawa (JP); Manabu Yata, Ishikawa (JP); Taro Hizume, Ishikawa (JP); Toshiyuki Sano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1059 days.

(21) Appl. No.: 11/576,726

(22) PCT Filed: Oct. 4, 2005

(86) PCT No.: PCT/JP2005/018330
§ 371 (c)(1),
(2), (4) Date: Apr. 5, 2007

(87) PCT Pub. No.: WO2006/040960
PCT Pub. Date: Apr. 20, 2006

(65) Prior Publication Data
US 2008/0199101 A1    Aug. 21, 2008

(30) Foreign Application Priority Data
Oct. 8, 2004  (JP) ................ 2004-296195

(51) Int. Cl.
G06K 9/40    (2006.01)
G06K 9/38    (2006.01)

(52) U.S. Cl. ........ 382/266; 382/260; 382/261; 382/262; 382/263; 382/264; 382/270; 382/271; 382/272; 382/275

(58) Field of Classification Search .......... 382/260–264, 382/266, 270–272, 275
See application file for complete search history.

(56) References Cited

U.S. PATENT DOCUMENTS

| | | | | |
|---|---|---|---|---|
| 4,590,582 A | * | 5/1986 | Umemura | 708/308 |
| 5,065,444 A | * | 11/1991 | Garber | 382/275 |
| 5,148,809 A | * | 9/1992 | Biegeleisen-Knight et al. | 600/443 |
| 5,351,305 A | * | 9/1994 | Wood et al. | 382/128 |
| 5,381,490 A | | 1/1995 | Shin | |
| 5,819,035 A | * | 10/1998 | Devaney et al. | 709/202 |
| 5,920,653 A | * | 7/1999 | Silverstein | 382/266 |
| 6,148,115 A | * | 11/2000 | Mackinnon et al. | 382/266 |
| 6,175,658 B1 | * | 1/2001 | Kump et al. | 382/266 |
| 6,721,457 B1 | * | 4/2004 | Atkins et al. | 382/260 |
| 6,728,416 B1 | * | 4/2004 | Gallagher | 382/265 |

(Continued)

FOREIGN PATENT DOCUMENTS

JP    4-000576    1/1992

(Continued)

*Primary Examiner* — Bhavesh M Mehta
*Assistant Examiner* — Gandhi Thirugnanam
(74) *Attorney, Agent, or Firm* — Pearne & Gordon LLP (57) ABSTRACT

An object of the present invention is to provide an image processing apparatus capable of obtaining a sharp image having less noise, comprising: a horizontal edge strength calculating unit 22 for calculating an edge strength along a horizontal direction of a concerned pixel; and a prefilter 24 for carrying out a filter processing based on the horizontal edge strength, and performing noise reduction and edge enhancement, a vertical edge strength calculating unit 23 for calculating an edge strength along a vertical direction of the concerned pixel; and a prefilter 25 for carrying out a filter processing based on the vertical edge strength, and performing noise reduction and edge enhancement, thereby enabling to sharpen image data in the vicinity of the concerned pixel respectively along horizontal and vertical directions, and obtain an image having less noises as well as sharp for edge directions.

6 Claims, 7 Drawing Sheets

U.S. PATENT DOCUMENTS

| | | | |
|---|---|---|---|
| 6,757,442 B1 * | 6/2004 | Avinash | 382/274 |
| 6,788,826 B1 * | 9/2004 | Van de Velde et al. | 382/275 |
| 6,928,196 B1 * | 8/2005 | Bradley et al. | 382/300 |
| 7,127,122 B2 * | 10/2006 | Ogata et al. | 382/260 |
| 7,167,595 B2 * | 1/2007 | Hiroshige et al. | 382/266 |
| 7,352,896 B2 * | 4/2008 | Rantanen et al. | 382/167 |
| 7,406,208 B2 * | 7/2008 | Chiang | 382/266 |
| 7,664,326 B2 * | 2/2010 | Tamura | 382/199 |
| 2002/0159650 A1 * | 10/2002 | Hiroshige et al. | 382/261 |
| 2002/0181024 A1 | 12/2002 | Morimoto | |
| 2002/0181800 A1 * | 12/2002 | Hamada et al. | 382/266 |
| 2003/0026495 A1 * | 2/2003 | Gondek et al. | 382/261 |
| 2003/0081854 A1 * | 5/2003 | Deshpande | 382/261 |
| 2003/0190086 A1 * | 10/2003 | Kim | 382/275 |
| 2003/0218776 A1 | 11/2003 | Morimoto et al. | |
| 2004/0207881 A1 * | 10/2004 | Nomura | 358/3.24 |
| 2005/0025382 A1 * | 2/2005 | Oizumi et al. | 382/266 |
| 2005/0123214 A1 * | 6/2005 | Takahira | 382/266 |
| 2005/0226525 A1 * | 10/2005 | Kuraki et al. | 382/261 |
| 2006/0026504 A1 * | 2/2006 | Balinsky | 715/513 |
| 2006/0039590 A1 * | 2/2006 | Lachine et al. | 382/128 |
| 2008/0123153 A1 * | 5/2008 | Yamada et al. | 358/3.27 |

FOREIGN PATENT DOCUMENTS

| | | |
|---|---|---|
| JP | 6-326868 | 11/1994 |
| JP | 2002-083294 | 3/2002 |
| JP | 2002-314814 | 10/2002 |
| JP | 2003-281529 | 10/2003 |

* cited by examiner

APPARATUS FOR CLEARING AN IMAGE AND METHOD THEREOF

TECHNICAL FIELD OF THE INVENTION

The present invention relates to an image processing apparatus and an image processing program capable of obtaining a sharp image less in noise in the field of digital image processing.

DESCRIPTION OF THE RELATED ART

In a conventional image processing apparatus, as a processing of sharpening an image, there have been widely known an edge enhancement processing. The processing is designed to enhance a variation of an image signal by adding a signal obtained by filtering the image signal by a HPF (high pass filter) to the image signal, and thus enhance the edge of the image. In the conventional image processing apparatus thus constructed, however, noise components of the image signal may also be enhanced by the HPF, and the image may be thus deteriorated in signal-to-noise ratio.

In order to overcome the aforementioned problem, an image processing apparatus for adaptively carrying out high-definition correction is proposed. A conventional image processing apparatus of this type will be described hereinlater with reference to FIG. 7.

Figure 7:
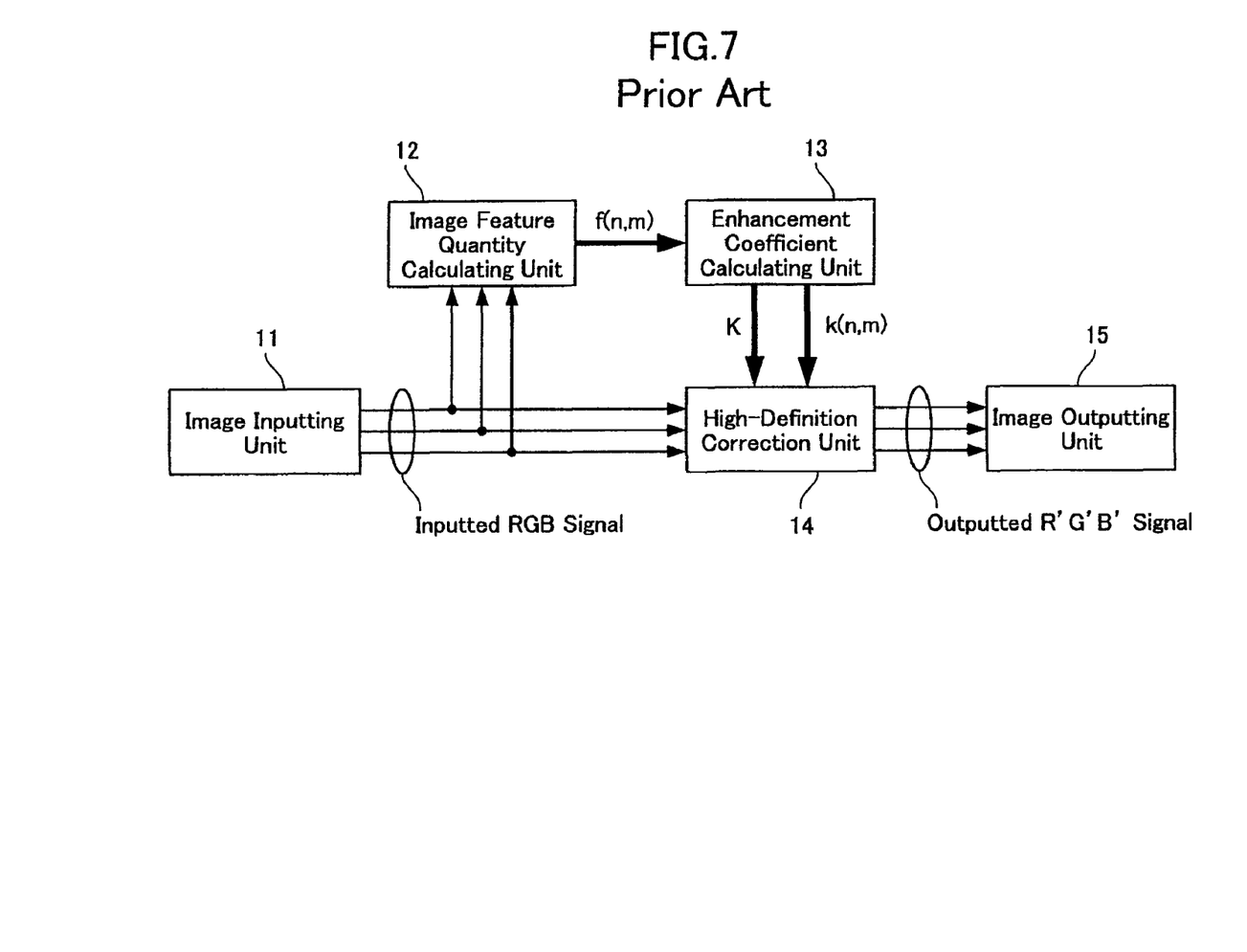
FIG. 7 is a block diagram showing a conventional image processing apparatus.

As shown in FIG. 7, the conventional image processing apparatus comprises an image feature quantity calculating unit 12 for calculating, as an image feature quantity, color edge information from inputted image data, an enhancement coefficient calculating unit 13 for calculating an enhancement coefficient in such a manner that an enhancement coefficient to be used for smoothing a sharpness level is calculated if the image feature quantity thus calculated is equal to or less than a first value, an enhancement coefficient to be used for enhancing a sharpness level is calculated if the image feature quantity thus calculated is greater than the first value but equal to or less than a second value, and an enhancement coefficient, which will not correct a sharpness level, is calculated if the image feature quantity thus calculated is greater than the second value, and a high-definition correction unit 14 for carrying out high-definition correction on the inputted image data in accordance with the enhancement coefficient thus calculated, thereby enabling to calculate the color edge information values, compare the color edge information values with predetermined threshold values, and carry out high-definition correction on the inputted image data in accordance with the enhancement coefficients respectively calculated in different cases (See, for example, Patent Document 1).

[Patent Document 1] Japanese Patent Laid Open Publication No. 2002-83294 (Abstract, FIG. 1)

DISCLOSURE OF THE INVENTION

Problems to be Solved by the Invention

The conventional image processing apparatus thus constructed as previously mentioned, however, encounters a drawback in that images in the vicinity of edges may be sharpened regardless of their directions, since no consideration is given to directions of the edges.

The present invention is made for overcoming the aforementioned drawbacks, and it is therefore an object of the present invention to provide an image processing apparatus capable of obtaining an image having less noises as well as sharp for edge directions.

Means for Solving the Problems

In accordance with a first aspect of the present invention, there is provided an image processing apparatus according to the present invention, comprising: image data inputting means for inputting image data, edge strength calculating means for calculating an edge strength along a specific direction based on a difference of level between a concerned pixel of said inputted image data and a pixel disposed in the vicinity of said concerned pixel, filter processing means for determining a filter based on said edge strength along said specific direction calculated by said edge strength calculating means, carrying out filter processing on pixel data, and selectively performing noise reduction and edge enhancement by way of said filter, edge enhancement signal generating means for generating an edge enhancement signal based on said pixel data on which said filter processing has been carried out, and image correcting means for correcting said inputted image data based on said edge enhancement signal.

The image processing apparatus according to the present invention thus constructed as previously mentioned can reduce noises as well as sharpen an image in the vicinity of the concerned pixel along the specific direction, thereby enabling to obtain the image having less noises as well as sharp for edge directions, resulting from the fact that the image data is filtered in accordance with the edge strength of the concerned pixel and a neighboring pixel along the specific direction.

Further, in the image processing apparatus according to the present invention, said filter processing means may select a smoothing filter if said edge strength along said specific direction is equal to or less than a first value, and select an edge enhancement filter if said edge strength along said specific direction is greater than a second value.

The image processing apparatus according to the present invention thus constructed as previously mentioned can smoothen a concerned image portion if the concerned pixel along the specific direction is smooth, but sharpen the concerned image portion if the concerned pixel along the specific direction constitutes an edge, thereby enabling to obtain the image having less noises as well as sharp for edge directions, resulting from the fact that the filter processing is carried out by way of smoothing filter if the edge strength along the specific direction is low but the filter processing is carried out by way of edge enhancement filter if the edge strength along the specific direction is high.

Further, the image processing apparatus according to the present invention, said filter processing means may calculate a filter coefficient by way of linear transformation of said edge strength along said specific direction, and selectively carry out noise reduction and edge enhancement on data of said concerned pixel in accordance with said filter coefficient linearly varying.

The image processing apparatus according to the present invention thus constructed as previously mentioned can smoothly change the filter characteristics from smoothing to high frequency enhancement in accordance with the edge strength in the vicinity of the concerned pixel, and thus eliminate the changeover of signal processing caused by the threshold values, thereby enabling to eliminate discontinuity of image caused by the changeover of processing, resulting from the fact that noise reduction or the edge enhancement of the concerned pixel data is carried out in accordance with the filter coefficient linearly varying.

Further, in image processing apparatus according to the present invention, said filter processing means may calculate a preliminary value by multiplying said edge strength along said specific direction by a gradient coefficient and adding an image quality adjusting value to be used for adjusting image quality to the multiplication result, compare said preliminary value with a predetermined upper limit and a predetermined lower limit, determine, as a weighting coefficient, said upper limit if said preliminary value is greater than said upper limit, said lower limit if said preliminary value is less than said lower limit, and said preliminary value if said preliminary value is not greater than said upper limit nor less than said lower limit, and selectively perform noise reduction and edge enhancement by carrying out weighted addition using said weighting coefficient on data of said concerned pixel.

The image processing apparatus according to the present invention thus constructed as previously mentioned can adjust the image with ease, resulting from the fact that the amount of noise reduction or the amount of edge enhancement can be adjusted using the gradient coefficient, and a variety of image qualities from a soft image quality to a sharp image quality can be selected using the image quality adjusting value. Further, the image processing apparatus according to the present invention can prevent the image quality from being deteriorated caused by too much filtering, resulting from the fact that values above the upper limit or below the lower limit are clipped off.

Further, in the image processing apparatus according to the present invention, said filter processing means may carry out said weighted addition by adding a product of a difference value of data between said concerned pixel and an average value of pixels respectively disposed in the vicinity of said concerned pixel, and said weighting coefficient, to an average value of data of pixels respectively disposed in the vicinity of said concerned pixel.

The image processing apparatus according to the present invention thus constructed as previously mentioned can smoothen a concerned image portion if the concerned pixel along the specific direction is smooth, but sharpen the concerned image portion if the concerned pixel along the specific direction constitutes an edge, thereby enabling to obtain the image having less noises as well as sharp for edge directions, resulting from the fact that filter processing is carried out selectively by way of low pass filter and high pass filter in accordance with the weighting coefficient, in such a manner that smoothing filter is carried out by way of smoothing filter if the edge strength along the specific direction is low and the filter processing is carried out by way of edge enhancement filter if the edge strength along the specific direction is high.

Further, in the image processing apparatus according to the present invention, said gradient coefficient and said image quality adjusting value may be determined based on the amount of noises contained in said image data.

The image processing apparatus according to the present invention thus constructed as previously mentioned can effectively carry out filter processing in accordance with the amount of noises contained in said image data.

Further, in image processing apparatus according to the present invention, said specific direction may include at least a horizontal direction and a vertical direction, said edge strength calculating means may include a horizontal edge strength calculating unit for calculating an edge strength along a horizontal direction based on a difference of data level between said concerned pixel and pixels respectively disposed in left and right sides of said concerned pixel, and a vertical edge strength calculating unit for calculating an edge strength along a vertical direction based on a difference of data level between said concerned pixel and pixels respectively disposed in upper and lower sides of said concerned pixel, said filter processing means may include a horizontal filter processing unit for calculating a horizontal filter based on said edge strength along said horizontal direction calculated by said horizontal edge strength calculating unit, and selectively performing horizontal noise reduction and horizontal edge enhancement using said horizontal filter, and a vertical filter processing unit for calculating a vertical filter based on said edge strength along said vertical direction calculated by said vertical edge strength calculating unit, and selectively performing vertical noise reduction and vertical edge enhancement using said vertical filter, and said edge enhancement signal generating means may generate an edge enhancement signal based on data of pixel on which said horizontal filter processing has been carried out and data of pixel on which said vertical filter processing has been carried out.

The image processing apparatus according to the present invention thus constructed as previously mentioned can smoothen an image along one of the horizontal and vertical directions but sharpen the images along the other one of them while reducing singles noises both along horizontal and vertical directions, thereby enabling to obtain the image having less noises as well as sharp for edge directions, resulting from the fact that the horizontal and vertical edges are detected independently from each other, and separate filter processing are carried out respectively both along the horizontal and vertical directions.

Further, in the image processing apparatus according to the present invention, said edge strength calculating means may further include a first diagonal direction edge strength calculating unit for calculating an edge strength along a first diagonal direction based on a difference of data level between said concerned pixel and pixels respectively disposed in upper and lower sides of said concerned pixel along said first diagonal direction, and a second diagonal direction edge strength calculating unit for calculating an edge strength along a second diagonal direction based on a difference of data level between said concerned pixel and pixels respectively disposed in upper and lower sides of said concerned pixel along said second diagonal direction, said filter processing means may include a first diagonal direction filter processing unit for calculating a first diagonal direction filter based on said edge strength along said first diagonal direction calculated by said first diagonal direction edge strength calculating unit, and selectively performing first diagonal direction noise reduction and first diagonal direction edge enhancement using said first diagonal direction filter, and a second diagonal direction filter processing unit for calculating a second diagonal direction filter based on said edge strength along said second diagonal direction calculated by said second diagonal direction edge strength calculating unit, and selectively performing second diagonal direction noise reduction and second diagonal direction edge enhancement using said second diagonal direction filter, and said edge enhancement signal generating means may generate an edge enhancement signal based on data of pixel on which said first direction filter processing has been carried out and data of pixel on which said second direction filter processing has been carried out.

The image processing apparatus according to the present invention thus constructed as previously mentioned can smoothen an image along one of the first and second diagonal directions but sharpen the images along the other one of them while reducing singles noises both along the first and second diagonal directions, thereby enabling to obtain the image having less noises as well as sharp for edge directions, resulting from the fact that the edges along the first and second diagonal directions are detected independently from each other, and separate filter processing are carried out respectively both along the first and second diagonal directions.

In accordance with a second aspect of the present invention, there is provided an image processing program, comprising: an image data inputting step of inputting image data; an edge strength calculating step of calculating an edge strength along a specific direction based on a difference of level between a concerned pixel of said inputted image data and a pixel disposed in the vicinity of said concerned pixel, a filter processing step of selecting a filter processing to be carried out based on said edge strength along said specific direction calculated in said edge strength calculating step, carrying out said filter processing thus selected on pixel data, and selectively performing noise reduction and edge enhancement, an edge enhancement signal generating step for generating an edge enhancement signal based on said pixel data on which said filter processing has been carried out, and an image correcting step of correcting said inputted image data based on said edge enhancement signal The image processing program according to the present invention thus constructed as previously mentioned can reduce noises as well as sharpen an image in the vicinity of the concerned pixel along the specific direction, thereby enabling to obtain the image having less noises as well as sharp for edge directions, resulting from the fact that the image data is filtered in accordance with the edge strength of the concerned pixel and a neighboring pixel along the specific direction.

Advantageous Effect of the Invention

It is an object of the present invention to provide an image processing apparatus, comprising edge strength calculating means for calculating an edge strength of a concerned pixel and neighboring pixels along a specific direction, and filter processing means for carrying out filter processing based on said edge strength along said specific direction and selectively performing noise reduction and edge enhancement, and having an advantageous effect of sharpening image data in the vicinity of the concerned pixel along the specific direction and thus obtaining an image having less noises as well as sharp for edge directions,

EXPLANATION OF THE REFERENCE NUMERALS 11 image inputting unit
12 image feature quantity calculating unit
13 enhancement coefficient calculating unit
14 high-definition correction unit
15 image outputting unit
21 image signal inputting unit (image data inputting means)
22 horizontal edge strength calculating unit
23 vertical edge strength calculating unit
24 prefilter (horizontal filter processing unit)
25 prefilter (vertical filter processing unit)
26 horizontal and vertical edge enhancement signal generating unit (edge enhancement signal generating means)
27 adding unit (image correcting means)
28 image signal outputting unit
31 horizontal direction prefilter unit
32 vertical direction prefilter unit
40 horizontal direction prefilter unit
41 horizontal edge strength calculating unit
42 prefilter
51 vertical LPF
52 delay element
53 delay element
54 subtracting unit
55 subtracting unit
56 absolute value calculating processing unit
57 absolute value calculating processing unit
58 adding unit
71 gradient coefficient setting unit
72 gradient coefficient multiplying unit
73 offset setting unit
74 offset adding unit
75 upper and lower limit clip adjusting unit
81 delay element
82 adding unit
83 ½ multiplying unit
84 delay element
85 subtracting unit
86 multiplying unit
87 1/256 multiplying unit
88 adding unit

DETAILED DESCRIPTION OF THE PREFERRED EMBODIMENT

Preferred embodiments of the image processing apparatus according to the present invention will be described hereinlater with reference to the drawings.

First Preferred Embodiment

Figure 1:
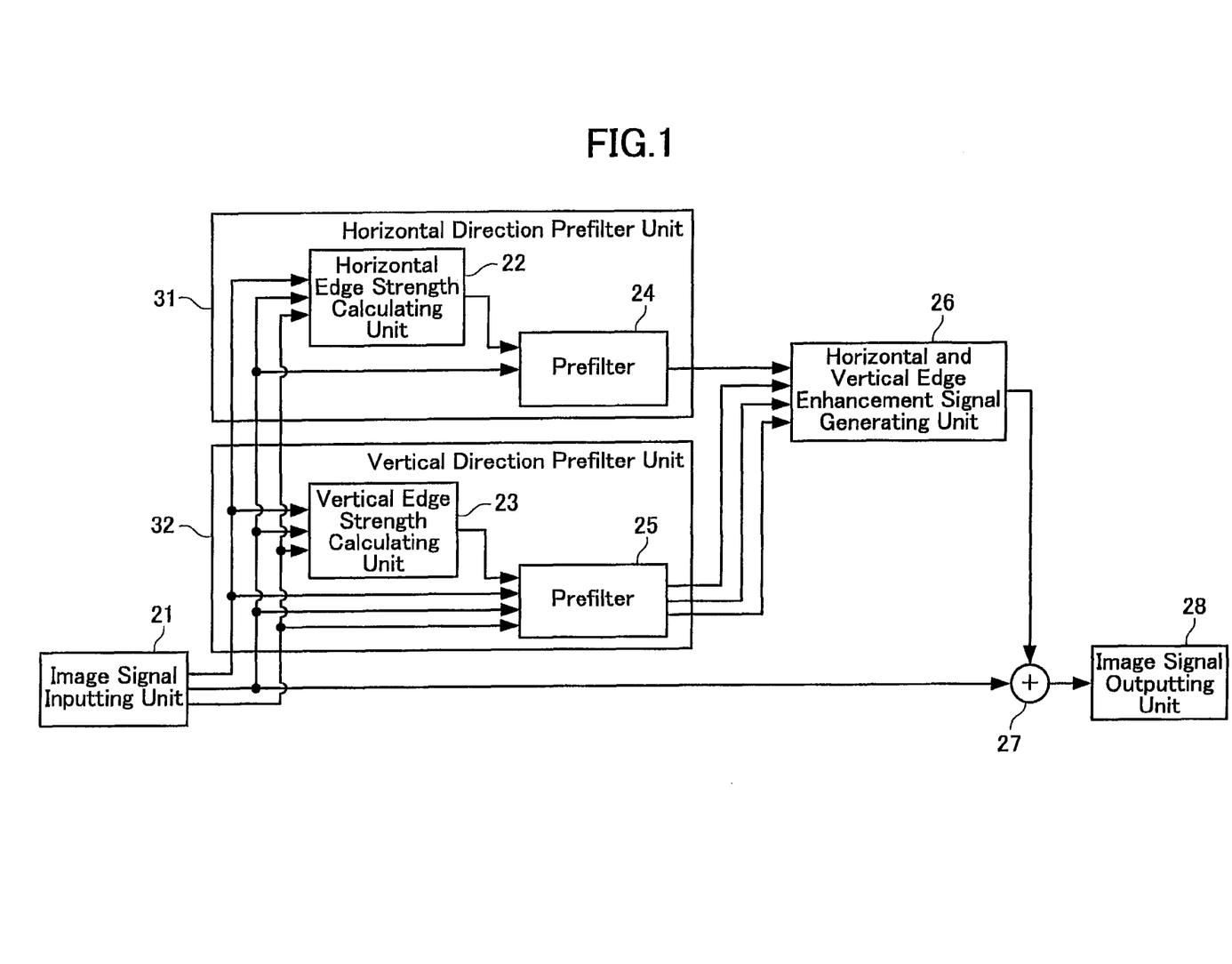
FIG. 1 is a block diagram showing an edge enhancement signal generating processing unit of a first preferred embodiment of the image processing apparatus according to the present invention.

Referring to FIG. 1 of the drawings, there is shown a block diagram showing a first preferred embodiment of the image processing apparatus according to the present invention.

FIG. 1 is a block diagram showing an edge enhancement signal generating processing unit of the image processing apparatus. As shown in FIG. 1, the edge enhancement signal generating processing unit comprises an image signal inputting unit (image data inputting means) 21 for inputting an image signal, a horizontal direction prefilter unit 31 for carrying out a filter processing in accordance with a an edge strength along a horizontal direction, a vertical direction prefilter unit 32 for carrying out a filter processing in accordance with an edge strength along a vertical direction, a horizontal and vertical edge enhancement signal generating unit (edge enhancement signal generating means) 26 for generating an edge enhancement signal, an adding unit (image correcting means) 27 for adding up signals, and an image signal outputting unit 28 for outputting an image signal.

Further, the horizontal direction prefilter unit 31 includes a horizontal edge strength calculating unit 22 for calculating an edge strength along a horizontal direction, and a prefilter (horizontal filter processing unit) 24 for carrying out a filter processing along the horizontal direction, and the vertical direction prefilter unit 32 includes a vertical edge strength calculating unit 23 for calculating an edge strength along a vertical direction, and a prefilter (vertical filter processing unit) 25 for caring out a filter processing along the vertical direction.

The image signal inputting unit 21 is designed to sequentially input signals in units of pixels. Here, image signals of a plurality of columns are inputted in parallel using, for example, a line memory, or the like, since signals for a plurality of lines are required in order to generate an edge enhancement signal along a vertical direction. Although three lines are used in the embodiment shown in FIG. 1, according to the present invention, the number of lines is not limited to three.

The horizontal edge strength calculating unit 22 is adapted to firstly filter inputted signals by a LPF (low pass filter) along the vertical direction, and calculate an absolute value of a difference value along the horizontal direction. This processing enables to reduce influences of noises, and detect an edge strength along the horizontal direction.

Similar to the horizontal edge strength calculating unit 22, the vertical edge strength calculating unit 23 is adapted to filter inputted signals by a horizontal LPF, calculate an absolute value of a difference value along the vertical direction, and detect an edge strength along the vertical direction.

The prefilter 24 is designed to carry out a filtering processing by the LPF if the horizontal edge strength calculated by the horizontal edge strength calculating unit 22 is low. The prefilter 24 is, on the other hand, designed to carry out a filtering processing by, for example, HPF, so as to enhance high frequency components, if the horizontal edge strength calculated by the horizontal edge strength calculating unit 22 is high. If a concerned pixel should have a single noise, the noise will be filtered by the LPF because the horizontal edge strength is low, and the influence of the noise is thus reduced.

Similar to the prefilter 24, the prefilter 25 is designed to carry out a filtering processing by the LPF if the vertical edge strength calculated by the vertical edge strength calculating unit 23 is low. The prefilter 25 is, on the other hand, designed to carry out a filtering processing by, for example, HPF, so as to enhance high frequency components, if the vertical edge strength calculated by the vertical edge strength calculating unit 23 is high.

The prefilter 24 and the prefilter 25 have respectively effects of reducing single noises. If the concerned pixel constitutes a horizontal edge, the edge is sharpened along the horizontal direction but smoothed along the vertical direction, and thus become sharp. The same applies to the vertical edge.

The horizontal and vertical edge enhancement signal generating unit 26 is adapted to receive output signals respectively from the prefilter 24 and the prefilter 25 and generate an edge enhancement signal.

The adding unit 27 is adapted to ad the edge enhancement signal generated by the horizontal and vertical edge enhancement signal generating unit 26 to a main line signal inputted by the image signal inputting unit 21, and the image signal outputting unit 28 is adapted to output the image signal added by the adding unit 27.

Although the processing along the horizontal direction and the vertical direction has been described with reference to FIG. 1, processing along, for example, diagonal directions may be added, likewise.

Figure 2:
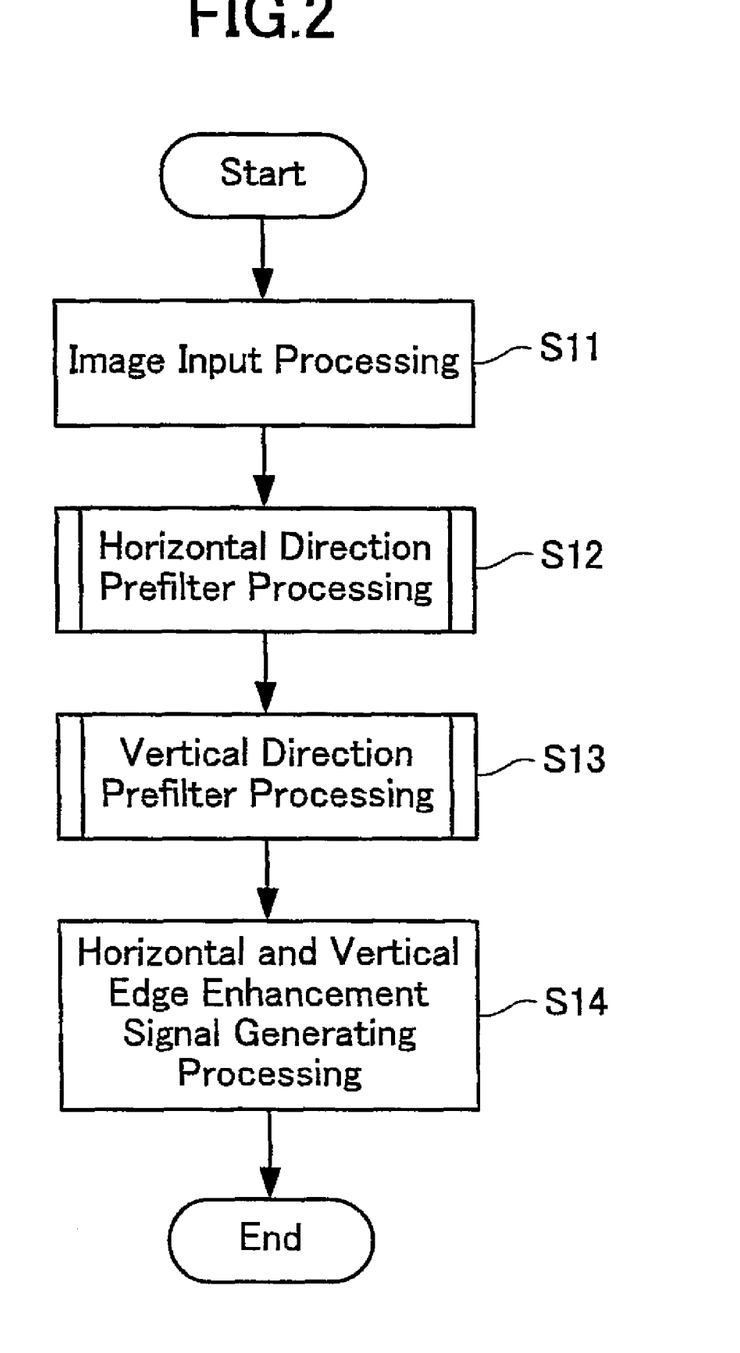
FIG. 2 is a flowchart showing an edge enhancement signal generating processing operation of the first preferred embodiment of the image processing apparatus according to the present invention.

The edge enhancement signal generating operation carried out by the image processing apparatus thus construct will be described hereinlater with reference to a flowchart shown in FIG. 2.

Firstly, in signal input processing, the image signal inputting unit 21 is operated to input an image signal (S11). In horizontal direction prefilter processing, the horizontal direction prefilter unit 31 is operated to input the image signal from the image signal inputting unit 21, detect an edge strength along the horizontal direction, and carry out a filter processing in accordance with the edge strength thus detected (S12). The horizontal direction prefilter processing will be described in detail later. Further, in vertical direction prefilter processing, the vertical direction prefilter unit 32 is operated to input the image signal from the image signal inputting unit 21, detect an edge strength along the vertical direction, and carry out a filter processing in accordance with the edge strength thus detected (S13). Here, the horizontal direction prefilter processing and the vertical direction prefilter processing may be prepared separately, or only one processing may be prepared so that the same processing will be called twice respectively for processing input signals along the horizontal direction and along the vertical direction.

Then, in horizontal and vertical edge enhancement signal generating processing, the horizontal and vertical edge enhancement signal generating unit 26 is operated to receive signals respectively prefiltered and outputted from the horizontal direction prefilter unit 31 and the vertical direction prefilter unit 32, and generate an edge enhancement signal, the adding unit 27 is operated to add the signal thus generated by the horizontal and vertical edge enhancement signal generating unit 26 to the image signal inputted by the image signal inputting unit 21, and image signal outputting unit 28 is operated to output the signal whose edge has been enhanced (S14).

The processing thus constructed enables to obtain a sharp image whose edge is enhanced while reducing the noise of the image.

Figure 3:
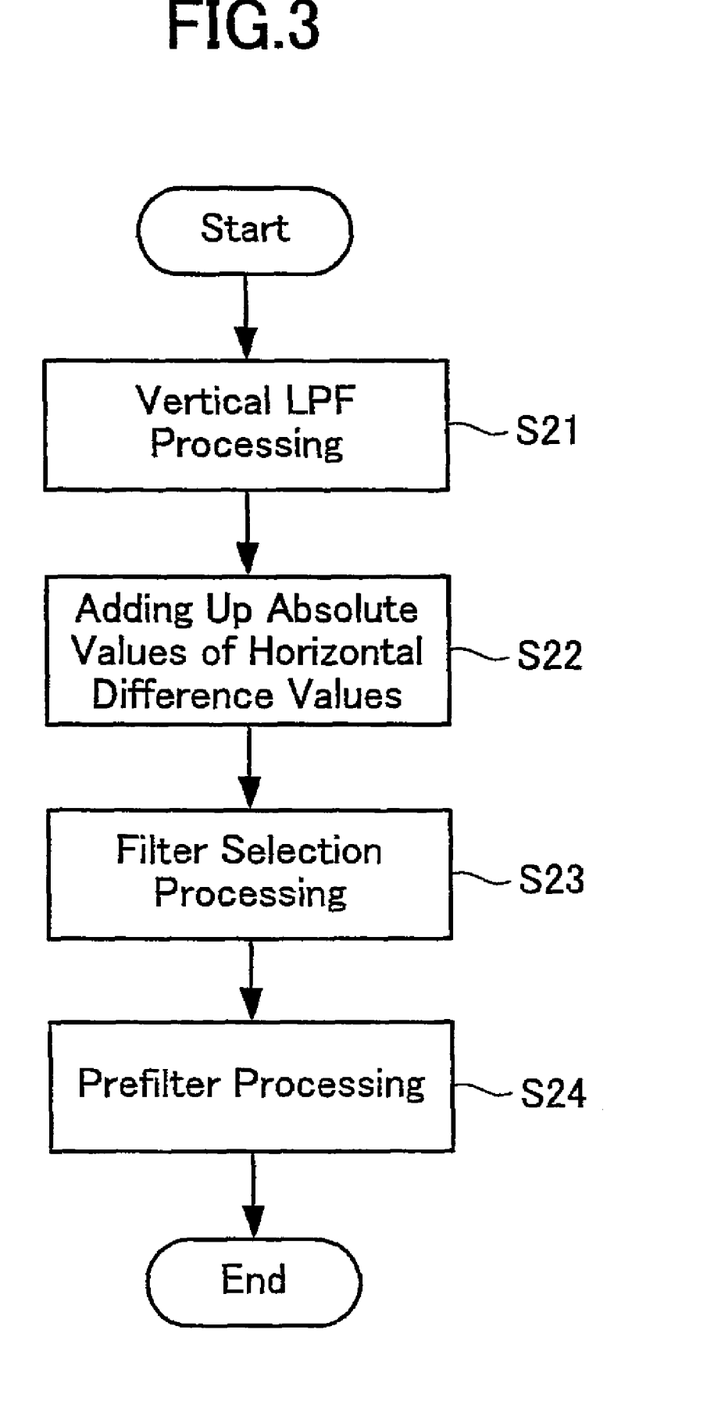
FIG. 3 is a flowchart showing the operation of a horizontal direction prefilter processing of the edge enhancement signal generating processing in the first preferred embodiment according to the present invention.

The operation of the horizontal direction prefilter processing will be described hereinlater with reference to a flowchart shown in FIG. 3.

Firstly, in the vertical LPF processing, noises are eliminated or reduced based on a plurality of pixel values along the vertical direction, based on signals inputted from the image signal inputting unit 21 (S21). In processing of adding up absolute values of horizontal difference values, absolute values of difference values between a pixel value of a concerned pixel and pixel values respectively disposed in left and right sides of the concerned pixel are added up, and an edge strength along the horizontal direction is thus obtained (S22). In filter selection processing, a filter is selected from among a plurality of filters in accordance with the edge strength thus obtained. This means that if the edge strength is low, a smoothing filter such as, for example, LPF is selected, and if, on the other hand, the edge strength is high, a filter such as, for example, HPF for enhancing the edge is selected, so that the high frequency component is enhanced. For example, two threshold values, i.e., a first threshold value and a second threshold value may be set, and the smoothing filter may be selected if the edge strength is equal to or less than the first threshold value, the edge enhancement filter may be selected if the edge strength is equal to or greater than the second threshold value. Then, the filter processing is carried out by means of the filter thus selected, and the signal thus processed is outputted (S24). It is herein assumed, if the edge strength is between the first threshold value and the second threshold value, the filter processing is not carried out. In stead, the signal is delayed and outputted at the same timing as the filter processing would have been carried.

The processing thus constructed enables to obtain a sharp image whose edge is enhanced while reducing the noise of the image.

Second Preferred Embodiment

The second preferred embodiment of the image processing apparatus according to the present invention will be described hereinlater.

The present embodiment of the image processing apparatus is different from the first embodiment of the image processing apparatus only in the horizontal edge enhancement signal generating processing and the vertical edge enhancement signal generating processing. This means that the present embodiment of the image processing apparatus is the same in construction as the first embodiment of the image processing apparatus except for the horizontal direction prefilter unit and the vertical direction prefilter unit.

Figure 4:
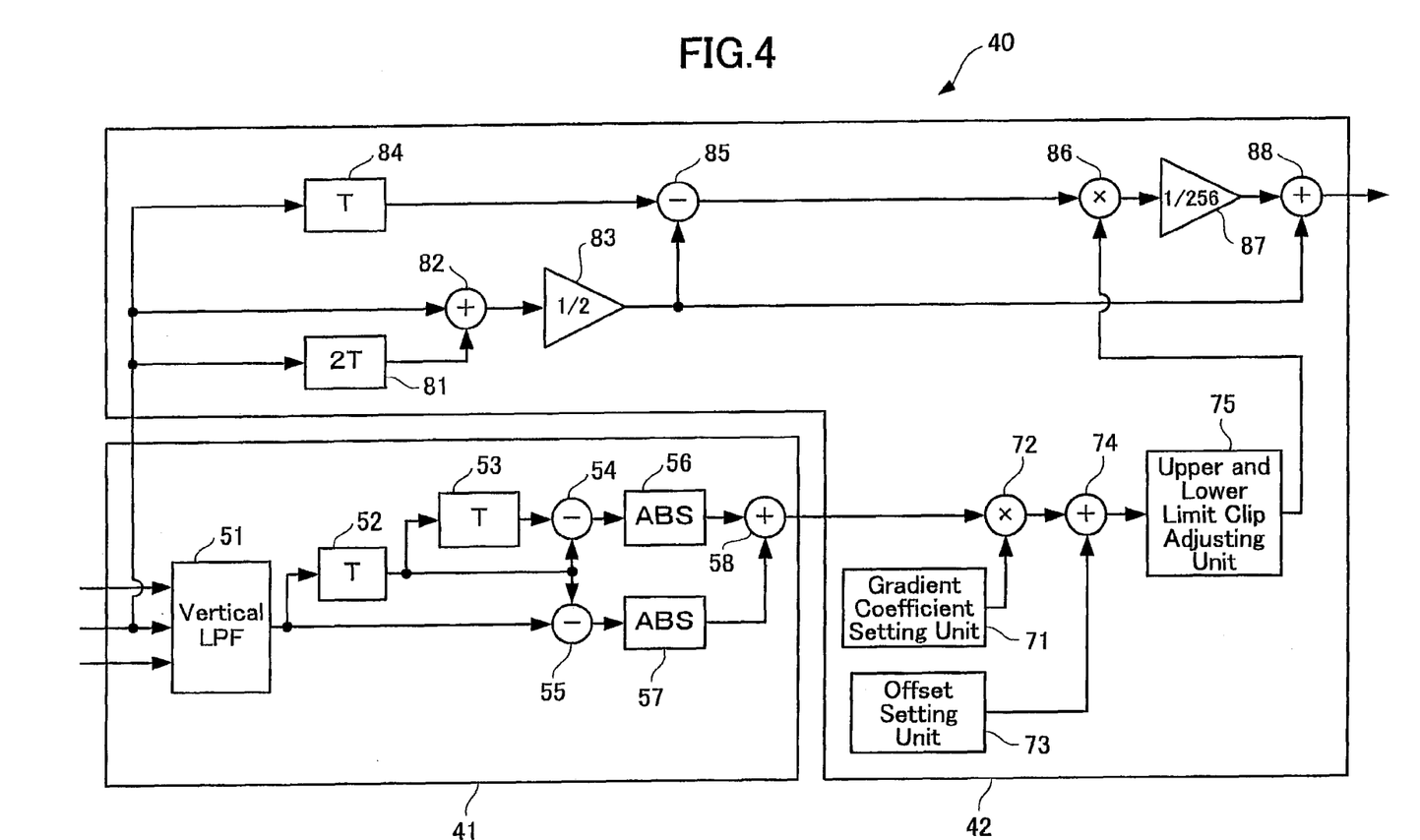
FIG. 4 is a block diagram showing a horizontal direction prefilter unit of an edge enhancement signal generating processing unit of a second preferred embodiment of the image processing apparatus according to the present invention.

FIG. 4 is a block diagram showing a horizontal direction prefilter unit of the present embodiment. The vertical direction prefilter unit is the same as the horizontal direction prefilter and will thus be omitted from description for avoiding tedious repetition.

As shown in FIG. 4, the horizontal direction prefilter unit 40 comprises a horizontal edge strength calculating unit 41 for calculating an edge strength along a horizontal direction and a prefilter 42 for carrying out a filter processing in accordance with the edge strength along a horizontal direction.

The horizontal edge strength calculating unit 41 includes a vertical LPF 51 for carrying out an LPF along the vertical direction, a delay element 52 and a delay element 53 each for delaying data, a subtracting unit 54 and a subtracting unit 55 each for calculating a difference value between two signals, an absolute value calculating processing unit 56 and an absolute value calculating processing unit 57 each calculating an absolute value of an inputted value, and an adding unit 58 for adding two inputted values.

The vertical LPF 51 is adapted to carry out an LPF processing along the vertical direction by inputting three line signals, and multiplying the line signals respectively by coefficients of, for example, ¼, ½, and ¼, and adding up all of the values thus multiplied. The coefficients of the LPF along the vertical direction, however, are not limited to the above values.

Each of the delay element 52 and the delay element 53 is adapted to temporarily store an inputted pixel signal therein, and delay the output timing of the pixel signal. It is herein assumed that each of the delay elements 52 and 53 is adapted to delay the signal for one piece of pixel data. The subtracting unit 54 and the subtracting unit 55 are adapted to calculate difference values respectively between a concerned pixel and a right signal and between the concerned signal and a left signal wherein the concerned pixel is intended to mean the pixel signal outputted from the delay element 52.

The absolute value calculating processing unit 56 and the absolute value calculating processing unit 57 are adapted to calculate absolute values of difference values between the concerned pixel and left and right pixels, respectively calculated by the subtracting unit 54 and the subtracting unit 55, and the adding unit 58 is adapted to add up the difference values between the concerned pixel and left and right pixels, respectively calculated by the absolute value calculating processing unit 56 and the absolute value calculating processing unit 57, and obtain the amount of image variation around the concerned pixel, as an edge strength along the horizontal direction in a local area (in this case, area of 3*3 pixels).

The prefilter 42 includes a gradient coefficient setting unit 71 for setting a gradient coefficient, a gradient coefficient multiplying unit 72 for multiplying data by the gradient coefficient set by the gradient coefficient setting unit 71, an offset setting unit 73 for setting an offset value, an offset adding unit 74 for adding the offset value set by the offset setting unit 73 to data, an upper and lower limit clip adjusting unit 75 for clipping an upper limit and a lower limit, a delay element 81 for delaying data for two pieces of pixel data, an adding unit 82, a ½ multiplying unit 83 for multiplying data by ½, a delay element 84 for delaying data for one piece of pixel data, a subtracting unit 85, a multiplying unit 86 for multiplying data by a weighting coefficient, an 1/256 multiplying unit 87 for multiplying data by 1/256, and an adding unit 88.

The gradient coefficient multiplying unit 72 is adapted to multiply the edge strength along the horizontal direction outputted by the adding unit 58 of the horizontal edge strength calculating unit 41 by the gradient coefficient set by the gradient coefficient setting unit 71, and the offset adding unit 74 is adapted to add the offset value set by the offset setting unit 73 data outputted from the gradient coefficient multiplying unit 72. The upper and lower limit clip adjusting unit 75 is adapted to clip values greater than a lower limit or smaller off data outputted from the offset adding unit 74, and then calculate a weighting coefficient. The method of calculating the weighting coefficient will be described later.

The delay element 81 is adapted to temporarily store therein an inputted pixel signal to have the output timing of the inputted pixel signal delayed for two pixels. The adding unit 82 and the ½ multiplying unit 83 are collectively adapted to average two pixels disposed in left and right sides of the concerned pixel delayed for one pixel, by adding up the pixel data delayed by the delay element 81 for two pixels and the pixel data not delayed, and then multiply the data thus added by ½.

The delay element 84 is adapted to temporarily store therein an inputted pixel signal to have the output timing of the inputted pixel signal delayed for one pixel, and then output a pixel signal indicative of the concerned pixel, i.e., a pixel value disposed in between two pixel values indicated by the pixel signals, which are respectively disposed in left and right sides of the signal of the concerned pixel, to be inputted to the adding unit 82. The subtracting unit 85 is adapted to calculate a difference value between the concerned pixel and the average value of the two pixels respectively disposed in left and right sides of the concerned pixel by subtracting a value outputted from the ½ multiplying unit 83 from the pixel data delayed by the delay element 84.

The multiplying unit 86 is adapted to multiply the output from the subtracting unit 85 by the output from the upper and lower limit clip adjusting unit 75, to obtain a multiplication gain, viz., a product of the difference value between the concerned pixel and the average value of the left and right pixel values, and the weighting coefficient. The 1/256 multiplying unit 87 is adapted to divide the multiplication gain outputted from the multiplying unit 86 by 256, since the multiplication gain of 256 is assumed to be one for the convenience of processing to be performed later. Needless to mention that the ½₅₆ multiplying unit 87 may be omitted if the decimal fraction computation is available.

The adding unit 88 is adapted to add up an output from the multiplying unit 86 through the ½₅₆ multiplying unit 87 and an output from the adding unit 82 through the ½ multiplying unit 83 and thus add up the multiplication gain and the average value of the left and right pixel values.

The output from the aforementioned processing can be expressed by the following expression.

(CENTER−AVE)*k+AVE  Expression 1

Here, "CENTER" is intended to mean the concerned pixel, "AVE" is intended to mean the average value of left and right pixels, and "k" is intended to mean the weighting coefficient. The expression 1 is equivalent to the expression described below.

CENTER*k+AVE*(1−k)  Expression 2

This means that the aforementioned processing can be carried out by filter processing of weighting the center pixel with 'k' and the left and right pixels with (1−k).

The filter characteristics can be changed by adjusting the weighting coefficient while the filter configuration remains unchanged. As will be appreciated from the aforementioned expression 2, the above-mentioned filter will function as a LPF when "k" is smaller than 1. When, on the other hand, "k" is greater than one, (1−k) results in a negative value, and the above-mentioned filter will function to enhance high frequency components.

Figure 5:
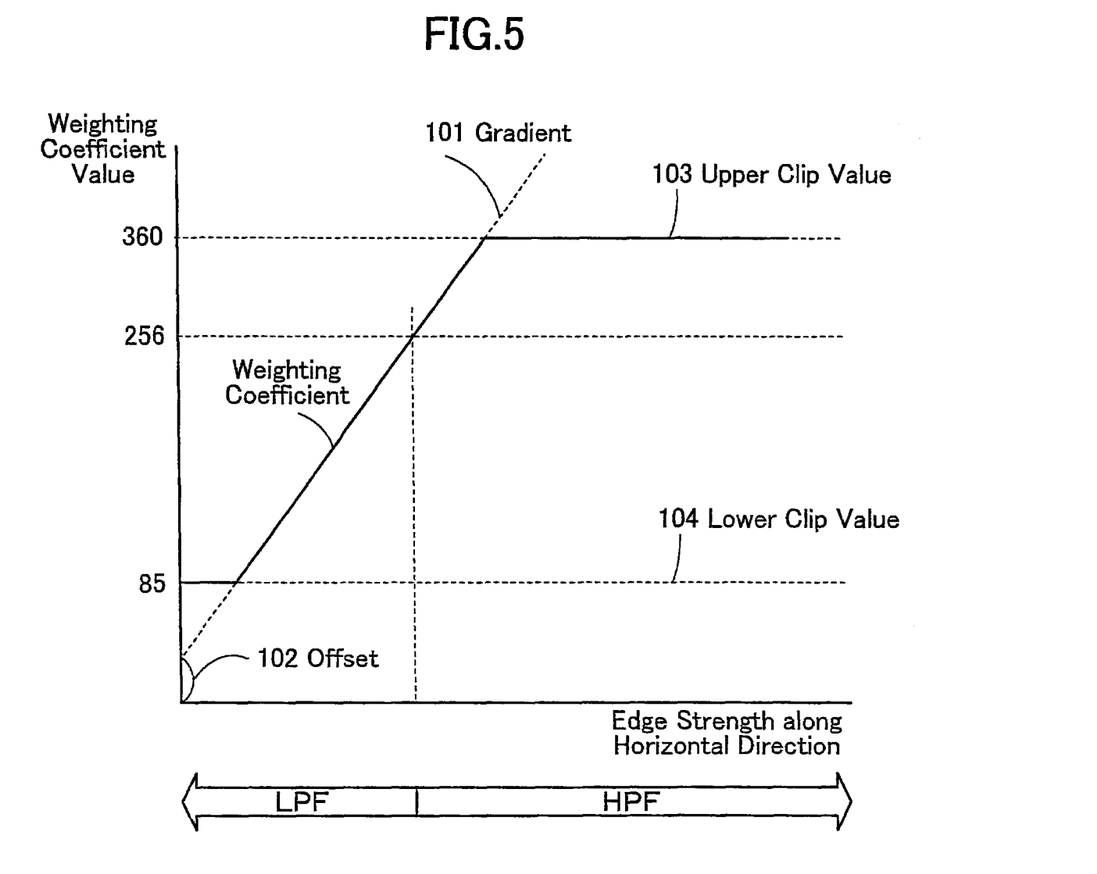
FIG. 5 is a graph explaining a relationship of a weighting coefficient with respect to an edge strength in the second preferred embodiment of the image processing apparatus according to the present invention.

The computation of the weighting coefficient will be described hereinlater with reference to FIG. 5. FIG. 5 is a graph explaining the relationship between the weighting coefficient and the edge strength. The horizontal axis indicates the edge strength along the horizontal direction, and the vertical axis indicates the weighting coefficient value. In the present embodiment, the weighting coefficient value is a product of the weighting coefficient "k" and 256.

The gradient 101 of the graph is determined by the gradient coefficient set by the gradient coefficient setting unit 71, and can adjust the amount of variation of the filter characteristics in relation to the variation of the image. The gradient coefficient setting unit 71 may adjust the gradient coefficient in accordance with, for example, the amount of noises contained in a signal inputted to the image signal inputting unit, not shown.

The offset 102 is determined by the offset value set by the offset setting unit 73, and can adjust the image quality from soft level to sharp level. The offset value constitutes an image quality adjusting value. The offset setting unit 73 may set the offset value in accordance with, for example, the amount of noises contained in a signal inputted to the image signal inputting unit, not shown.

Further, the weighting coefficient value is determined by the upper and lower limit clip adjusting unit 75. This means that the upper and lower limit clip adjusting unit 75 is adapted to compare the value outputted from the offset adding unit 74 with the upper clip value 103 and the lower clip value 104, and output the upper clip value 103 when the value outputted from the offset adding unit 74 is higher than the upper clip value 103, output the lower clip value 104 when the value outputted from the offset adding unit 74 is lower than the lower clip value 104, and output the value outputted from the offset adding unit 74 when the value outputted from the offset adding unit 74 is not higher than the upper clip value 103, nor lower than the lower clip value 104.

As will be appreciated from the aforementioned expression 2, when the weighting coefficient "k" is at ⅓, the center pixel and the left and right pixels are equally weighted by ⅓, and the above-mentioned filter will thus function as the strongest LPF. The lower limit of the weighting coefficient is herein assumed to be ⅓ because of the fact that the weighting coefficient "k" less than ⅓, on the other hand, is too small to be multiplied by the center pixel signal. In the case shown in FIG. 5, the multiplication gain of 256 is assumed to be one, and the lower clip value calculated as a result of multiplying ⅓ by 256, thus results in 86.

When the weighting coefficient "k" is greater than 1, (1−k) becomes a negative value, and the filter characteristics thus turns to be high frequency component enhancement. When the filter processing, on the other hand, is too strong, the image quality may be deteriorated. The upper limit of the weighting coefficient is, therefore, assumed to be approximately 14 (i.e., product of 14 and 256, viz., 360). Needless to mention, the present invention is not limited to the above values. The upper clip value and the lower clip value may be made variable, and the upper and lower limit clip adjusting unit 75 may set, as the upper clip value and the lower clip value, any values in accordance with, for example, the amount of noises contained in the signal.

It is to be understood from the foregoing description that the filter characteristics obtained by way of weighted addition can be smoothly changed, and thus discontinuity of the image caused by changeover of processing (changeover of filter characteristics) can be eliminated, resulting from the fact that the weighting coefficient "k" is calculated by way of linear transformation, in accordance with the amount of edge along the horizontal direction.

As will be appreciated from the foregoing description, it is to be understood that the present embodiment of the image processing apparatus can obtain an image smoother in smooth portions as well as sharper in edge portions without interrupting the processing, resulting from the fact that the weighting coefficient is calculated by way of linear transformation of the amount of edge, and the filter calculated by means of weighted addition is employed.

While it has been described in the present embodiment about the edge enhancement signal processing along the horizontal direction, the same applies to the edge enhancement signal processing along the vertical direction. In this case, the vertical LPF may be replaced with the horizontal LPF, and other constituent elements may be replaced between vertical processing and horizontal processing. The same applies to the edge enhancement signal processing along diagonal directions.

Though it has been described in the present embodiment that the weighting coefficient is calculated by way of linear transformation of the amount of edge, the present invention is not limited to the linear transformation. Further, though the present embodiment has been described in the area of 3*3 pixels, the present invention is not limited to the aforementioned processing area.

Figure 6:
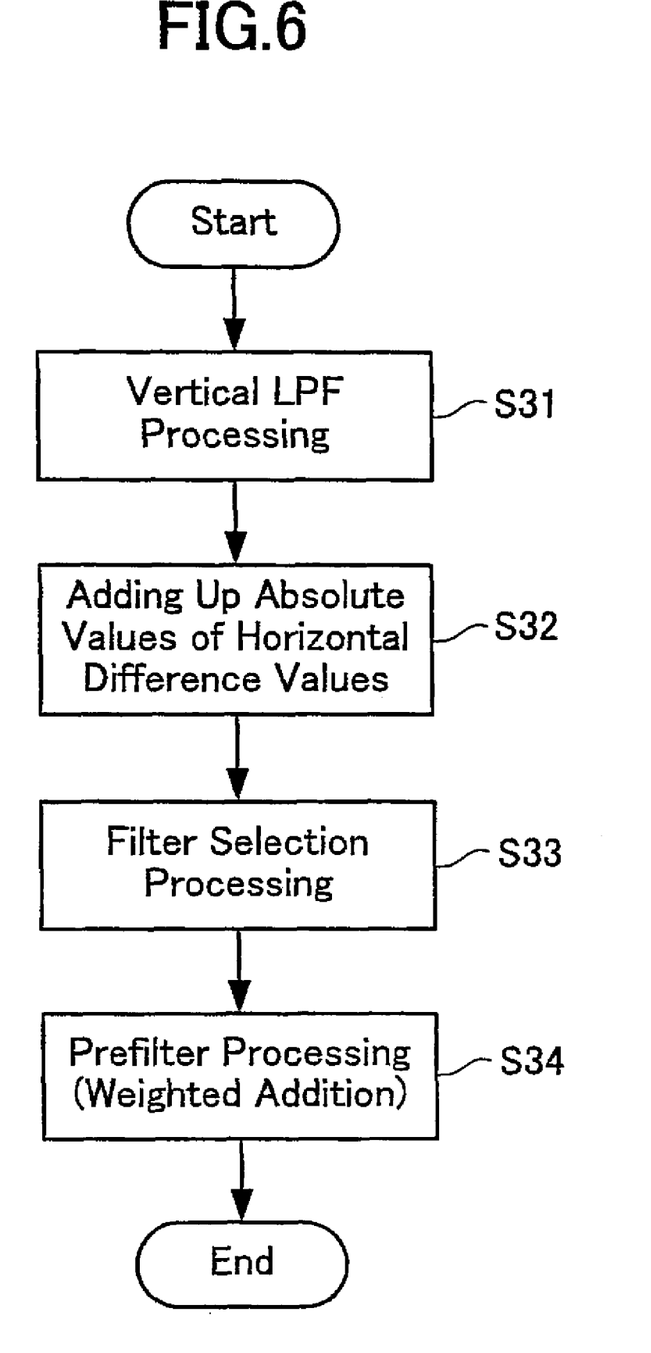
FIG. 6 is a flowchart showing the operation of a horizontal direction prefilter processing of an edge enhancement signal generating processing in the second preferred embodiment according to the present invention.

The operation of the horizontal direction prefilter processing of the present embodiment will be described hereinlater with reference to a flowchart shown in FIG. 6.

The present horizontal direction prefilter processing is a partial modification of the horizontal direction prefilter processing of the first embodiment. Therefore, only the steps of the present embodiment different from those of the horizontal direction prefilter processing of the first embodiment will be described hereinlater.

In the horizontal direction prefilter processing, filter coefficient calculating processing (S33) is provided in place of the filter selection processing. Further, the prefilter processing (S34) is carried out by way of weighted addition.

In the filter coefficient calculating processing (S33), the weighting coefficient is calculated by the gradient coefficient multiplying unit 72, the offset adding unit 74, and the upper and lower limit clip adjusting unit 75 based on the edge strength obtained by the adding unit 58. In the prefilter processing (S34), weighted addition processing is carried out by the multiplying unit 86, adding unit 88, and the like, using the weighting coefficient obtained in the filter coefficient calculating processing (S33).

It is to be understood from the foregoing description that the filter characteristics from the LPF to the high frequency enhancement can be smoothly controlled, and thus discontinuity of the image caused by changeover of processing can be eliminated.

Further, the preferred embodiments of the image processing apparatus according to the present invention may be constituted by, for example, a processor, a memory, respective electric circuits, and/or the like, or constituted by program modules executable by, for example, a processor to implement above processing.

INDUSTRIAL APPLICABILITY OF THE PRESENT INVENTION

As will be appreciated from the foregoing description, it is to be understood that the image processing apparatus according to the present invention can sharpen an image for a predetermined direction in the vicinity of a concerned pixel, has an advantageous effect of obtaining an image having less noises as well as sharp for edge directions, and is available as, for example, an image processing apparatus for carrying out digital image processing.

What is claimed is:

1. An image processing apparatus, comprising:
image data inputting means for inputting image data;
edge strength calculating means comprising a processor operable to execute program modules for calculating an edge strength along a specific direction based on a difference of level between a concerned pixel of said inputted image data and a pixel disposed in vicinity of said concerned pixel;
filter processing means comprising a processor operable to execute program modules for determining a filter based on said edge strength along said specific direction calculated by said edge strength calculating means, carrying out filter processing on pixel data, and selectively performing noise reduction and edge enhancement by way of said filter;
edge enhancement signal generating means for generating an edge enhancement signal based on said pixel data on which said filter processing has been carried out; and
image correcting means for correcting said inputted image data based on said edge enhancement signal, wherein
said filter processing means is operative to calculate a preliminary value by multiplying said edge strength along said specific direction by a gradient coefficient and adding an image quality adjusting value to be used for adjusting image quality to the multiplication result, to compare said preliminary value with a predetermined upper limit and a predetermined lower limit, to determine, as a weighting coefficient, said upper limit if said preliminary value is greater than said upper limit, said lower limit if said preliminary value is less than said lower limit, and said preliminary value if said preliminary value is not greater than said upper limit nor less than said lower limit, and to selectively perform noise reduction and edge enhancement by carrying out weighted addition using said weighting coefficient on data of said concerned pixel.

2. An image processing apparatus, comprising:
image data inputting means for inputting image data;
edge strength calculating means comprising a processor operable to execute program modules for calculating an edge strength along a specific direction based on a difference of level between a concerned pixel of said inputted image data and a pixel disposed in vicinity of said concerned pixel;
filter processing means comprising a processor operable to execute program modules for determining a filter based on said edge strength along said specific direction calculated by said edge strength calculating means, carrying out filter processing on pixel data, and selectively performing noise reduction and edge enhancement by way of said filter;
edge enhancement signal generating means for generating an edge enhancement signal based on said pixel data on which said filter processing has been carried out; and
image correcting means for correcting said inputted image data based on said edge enhancement signal, wherein
said specific direction includes at least a horizontal direction and a vertical direction,
said edge strength calculating means includes a horizontal edge strength calculating unit for calculating an edge strength along a horizontal direction based on a difference of data level between said concerned pixel and pixels respectively disposed in left and right sides of said concerned pixel, and a vertical edge strength calculating unit for calculating an edge strength along a vertical direction based on a difference of data level between said concerned pixel and pixels respectively disposed in upper and lower sides of said concerned pixel,
said filter processing means includes a horizontal filter processing unit for calculating a horizontal filter based on said edge strength along said horizontal direction calculated by said horizontal edge strength calculating unit and selectively performing horizontal noise reduction and horizontal edge enhancement using said horizontal filter, and a vertical filter processing unit for calculating a vertical filter based on said edge strength along said vertical direction calculated by said vertical edge strength calculating unit and selectively performing vertical noise reduction and vertical edge enhancement using said vertical filter, and
said edge enhancement signal generating means is operable to generate an edge enhancement signal based on data of pixel on which said horizontal filter processing has been carried out and data of pixel on which said vertical filter processing has been carried out.

3. An image processing method, comprising:
image data inputting step for inputting image data;
edge strength calculating step for calculating a plurality of edge strengths along a plurality of directions based on a difference of level between a concerned pixel of said inputted image data and a pixel disposed in vicinity of said concerned pixel;
filter processing step for determining a plurality of filters based on said edge strengths along said plurality of directions calculated by said edge strength calculating means, carrying out filter processing on pixel data, and selectively performing noise reduction and edge enhancement by way of said filters,
edge enhancement signal generating step for generating an edge enhancement signal based on said pixel data on which said filter processing has been carried out; and image correcting step for correcting said inputted image data based on said edge enhancement signal, wherein said plurality of directions includes at least a horizontal direction and a vertical direction, said edge strength calculating step includes a horizontal edge strength calculating step for calculating an edge strength along a horizontal direction based on a difference of data level between said concerned pixel and pixels respectively disposed in left and right sides of said concerned pixel, and a vertical edge strength calculating step for calculating an edge strength along a vertical direction based on a difference of data level between said concerned pixel and pixels respectively disposed in upper and lower sides of said concerned pixel, said filter processing step includes a horizontal filter processing step for calculating a horizontal filter based on said edge strength along said horizontal direction calculated in said horizontal edge strength calculating step and selectively performing horizontal noise reduction and horizontal edge enhancement using said horizontal filter, and a vertical filter processing step for calculating a vertical filter based on said edge strength along said vertical direction calculated in said vertical edge strength calculating step and selectively performing vertical noise reduction and vertical edge enhancement using said vertical filter, and said edge enhancement signal generating step is to generate an edge enhancement signal based on data of pixel on which said horizontal filter processing has been carried out and data of pixel on which said vertical filter processing has been carried out.

4. An image processing apparatus as set forth in claim 1, in which said filter processing unit is operative to carry out said weight addition by adding a product of a difference value of data between said concerned pixel and an average value of pixels respectively disposed in the vicinity of said concerned pixel, and said weight coefficient, to an average value of data of said pixels disposed in the vicinity of said concerned pixel.

5. An image processing apparatus as set forth in claim 1, in which said gradient coefficient and said image quality adjusting value are determined based on the amount of noise contained in said image data.

6. An image processing apparatus as set forth in claim 2, in which said edge strength calculating means further includes a first diagonal direction edge strength calculating unit for calculating an edge strength along a first diagonal direction based on a difference of data level between said concerned pixel and pixels respectively disposed in upper and lower sides of said concerned pixel along said first diagonal direction, and a second diagonal direction edge strength calculating unit for calculating an edge strength along a second diagonal direction based on a difference of data level between said concerned pixel and pixels respectively disposed in upper and lower sides of said concerned pixel along said second diagonal direction, said filter processing means includes a first diagonal direction filter processing unit for calculating a first diagonal direction filter based on said edge strength along said first diagonal direction calculated by said first diagonal direction edge strength calculating unit and selectively performing first diagonal direction noise reduction and first diagonal direction edge enhancement using said first diagonal direction filter, and a second diagonal direction filter processing unit for calculating a second diagonal direction filter based on said edge strength along said second diagonal direction calculated by said second diagonal direction edge strength calculating unit and selectively performing second diagonal direction noise reduction and second diagonal direction edge enhancement using said second diagonal filter, and said edge enhancement signal generating means is operative to generate an edge enhancement signal based on data of pixel on which said first diagonal direction filter processing has been carried out and data of pixel on which said second diagonal direction filter processing has been carried out.

* * * * *